United States Patent
Chauvin et al.

(10) Patent No.: US 10,180,070 B2
(45) Date of Patent: Jan. 15, 2019

(54) TOOLING FOR FASTENING METAL REINFORCEMENT ON THE LEADING EDGE OF A TURBINE ENGINE BLADE, AND A METHOD USING SUCH TOOLING

(71) Applicants: SAFRAN, Paris (FR); SAFRAN AIRCRAFT ENGINES, Paris (FR)

(72) Inventors: Thierry Chauvin, Ermenonville (FR); Franck Bernard Leon Varin, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 469 days.

(21) Appl. No.: 14/889,710

(22) PCT Filed: Apr. 28, 2014

(86) PCT No.: PCT/FR2014/051012
§ 371 (c)(1),
(2) Date: Nov. 6, 2015

(87) PCT Pub. No.: WO2014/181055
PCT Pub. Date: Nov. 13, 2014

(65) Prior Publication Data
US 2016/0076387 A1    Mar. 17, 2016

(30) Foreign Application Priority Data
May 6, 2013   (FR) ...................... 13 54147

(51) Int. Cl.
*B29C 65/00* (2006.01)
*B32B 37/00* (2006.01)
(Continued)

(52) U.S. Cl.
CPC .......... *F01D 5/282* (2013.01); *B29C 65/7847* (2013.01); *B29C 66/81411* (2013.01);
(Continued)

(58) Field of Classification Search
CPC ......... F05D 2240/121; F05D 2240/303; F05D 2230/23; F05D 2300/702; F05D 2220/36;
(Continued)

(56) References Cited

U.S. PATENT DOCUMENTS 5,430,937 A * 7/1995 Leahy ................... B29C 70/446
                                                                    29/706
5,528,828 A    6/1996 Leahy et al.
(Continued)

FOREIGN PATENT DOCUMENTS

EP      1 777 063 A1    4/2007

OTHER PUBLICATIONS

International Search Report dated Oct. 23, 2014 for PCT/FR2014/051012 filed on Apr. 28, 2014.

*Primary Examiner* — Philip C Tucker
*Assistant Examiner* — Brian R Slawski
(74) *Attorney, Agent, or Firm* — Oblon, McClelland, Maier & Neustadt, L.L.P.

(57) ABSTRACT

A tooling for fastening metal reinforcement on the leading edge of a turbine engine blade, the tooling including a blade support for receiving a blade while leaving surfaces of the leading edge of the blade disengaged; and a leading edge reinforcement support on which the blade support is designed to be mounted, and including two lateral wedges between which the metal reinforcement for the leading edge of the blade is positioned, the wedges being suitable for being capable of moving towards each other and apart from each other and each of them being provided with a suction grid for gripping the metal reinforcement, the leading edge reinforcement support further including heater elements for polymerizing an adhesive film applied on the leading edge surfaces of the blade.

12 Claims, 9 Drawing Sheets

(51) Int. Cl.
C08J 5/00 (2006.01)
B31F 5/00 (2006.01)
B65H 29/00 (2006.01)
B29C 65/08 (2006.01)
B30B 5/02 (2006.01)
B30B 5/04 (2006.01)
B30B 15/34 (2006.01)
B21K 25/00 (2006.01)
B23P 15/04 (2006.01)
B21D 53/78 (2006.01)
B21K 3/04 (2006.01)
B23P 15/02 (2006.01)
F01D 5/28 (2006.01)
B29C 65/78 (2006.01)
F04D 29/02 (2006.01)
F04D 29/32 (2006.01)
F01D 25/28 (2006.01)
F01D 5/14 (2006.01)
B29C 65/48 (2006.01)
B23Q 3/06 (2006.01)
B29L 31/08 (2006.01)
B29K 101/00 (2006.01)
B29K 105/00 (2006.01)
B29C 65/18 (2006.01)

(52) U.S. Cl.
CPC ............ *F01D 5/147* (2013.01); *F01D 5/288* (2013.01); *F01D 25/285* (2013.01); *F04D 29/023* (2013.01); *F04D 29/324* (2013.01); *B23Q 3/063* (2013.01); *B29C 65/18* (2013.01); *B29C 65/48* (2013.01); *B29C 65/7841* (2013.01); *B29C 66/12441* (2013.01); *B29C 66/12449* (2013.01); *B29C 66/12461* (2013.01); *B29C 66/12464* (2013.01); *B29C 66/12469* (2013.01); *B29C 66/301* (2013.01); *B29C 66/53* (2013.01); *B29C 66/721* (2013.01); *B29C 66/7212* (2013.01); *B29C 66/72141* (2013.01); *B29C 66/742* (2013.01); *B29C 66/81423* (2013.01); *B29K 2101/00* (2013.01); *B29K 2105/0097* (2013.01); *B29L 2031/08* (2013.01); *B29L 2031/082* (2013.01); *F05D 2220/323* (2013.01); *F05D 2230/23* (2013.01); *F05D 2230/30* (2013.01); *F05D 2230/60* (2013.01); *F05D 2230/644* (2013.01); *F05D 2240/303* (2013.01); *F05D 2300/133* (2013.01); *F05D 2300/603* (2013.01)

(58) Field of Classification Search
CPC ...... F04D 29/324; F04D 29/023; F01D 5/147; F01D 5/282; B29C 65/4835; B29C 65/78; B29C 65/7841; B29C 65/7847; B29C 66/81; B29C 66/81421; B29C 66/81423; B29C 66/301; B29C 66/742; B29C 66/7428; B29C 66/7212
USPC ... 156/60, 94, 196, 212, 213, 228, 285, 293, 156/307.1, 307.7, 349, 443, 475, 538, 156/539, 556, 580, 581, 583.1, 583.6, 156/583.7, 583.8, 583.9; 29/889, 889.2, 29/889.21, 889.7, 889.71; 416/223 R, 416/241 R, 224, 229 R
See application file for complete search history.

(56) References Cited

U.S. PATENT DOCUMENTS

| | | |
|---|---|---|
| 5,570,631 A | 11/1996 | Leahy et al. |
| RE37,673 E | 4/2002 | Leahy et al. |
| RE37,774 E | 7/2002 | Leahy et al. |
| 2007/0092379 A1* | 4/2007 | Coupe .................... B29B 11/16 416/241 R |
| 2009/0057297 A1* | 3/2009 | Boschet ................. B29C 65/46 219/603 |
| 2009/0165299 A1* | 7/2009 | Cammer ................. B21D 53/78 29/889.7 |
| 2010/0269979 A1* | 10/2010 | Abitz .................... B29C 66/301 156/323 |
| 2011/0194941 A1* | 8/2011 | Parkin .................... B29C 70/48 416/224 |
| 2012/0233859 A1* | 9/2012 | Cattiez ................. B21D 26/021 29/889.7 |

* cited by examiner

TOOLING FOR FASTENING METAL REINFORCEMENT ON THE LEADING EDGE OF A TURBINE ENGINE BLADE, AND A METHOD USING SUCH TOOLING

BACKGROUND OF THE INVENTION

The present invention relates to the general field of turbine engines blades provided with metal reinforcement on their leading edges. The invention relates more particularly to tooling and to a method for fastening metal reinforcement on the leading edge of a turbine engine blade that is made of composite material.

It is known for fan blades of a turbine engine that are made of composite material to be fitted with structural reinforcement made of metal that extends over the full height of each blade. Such reinforcement serves to protect a composite blade in the event of an impact against the fan of a foreign body, such as a bird being ingested by the turbine engine, for example.

A known method of fastening metal reinforcement on the leading edge of a composite material blade is as follows. The blade is held in a support and a spanwise positioning marker for the leading edge of the blade is put into place. An adhesive film is then applied to the surfaces of the leading edge of the blade and the metal reinforcement is manually prepositioned on the leading edge of the blade. The adhesive is then polymerized in an autoclave.

Such a method presents numerous drawbacks. In particular, it is a manual method that depends on an operator, thereby presenting a high risk of variation in the material soundness of the adhesive and of variation in the relative positioning of the parts that are assembled together. Such risks need to be compensated by a very strict inspection regime. This leads to high production costs.

OBJECT AND SUMMARY OF THE INVENTION

A main object of the present invention is thus to propose tooling and a method for fastening an edge without presenting the above-specified drawbacks.

In accordance with the invention, this object is achieved by tooling for fastening metal reinforcement on the leading edge of a turbine engine blade, the tooling comprising a blade support for receiving a blade while leaving surfaces of the leading edge of the blade disengaged, and a leading edge reinforcement support on which the blade support is designed to be mounted, and comprising two lateral wedges between which the metal reinforcement for the leading edge of the blade is to be positioned, the wedges being suitable for being capable of moving towards each other and apart from each other, and each of them being provided with a suction grid for gripping the metal reinforcement, the leading edge reinforcement support further including heater elements for polymerizing an adhesive film applied on the leading edge surfaces of the blade when it is in position against the metal reinforcement.

This tooling makes it possible to avoid defects in relative positioning between the blade and the metal reinforcement, thereby ensuring that the positioning of the metal reinforcement on the leading edge of the blade is reproducible. In particular, the thickness of the adhesive can be controlled. The presence in the leading edge reinforcement support of wedges that can be moved apart from each other makes it possible to splay open the flanges of the reinforcement while putting the leading edge of the blade into place, thereby facilitating this operation. This avoids the reinforcement being assembled on the leading edge of the blade by force, thereby guaranteeing that the blade and the adhesive film are undamaged. Furthermore, the adhesive is polymerized outside an autoclave by using the heater elements in the tooling, thus making it possible to increase productivity and reduce the thermal fatigue of the blade. Furthermore, it is easy to control the temperature throughout the entire polymerizing cycle (temperature rise, dwell, temperature drop) can easily be controlled.

Preferably, the blade support comprises a suction side half-shell having a recess of shape complementary to the shape of a suction side surface of the blade, a pressure side half-shell having a recess of shape complementary to the shape of the pressure side surface of the blade, and means for applying a tightening force between the pressure side half-shell and the suction side half-shell.

Also preferably, the blade support further includes wedges for clamping a leading edge of the blade. This additional clamping serves to hold the blade in place in the event of the blade being too thin. The use of a plurality of clamping wedges serves to guarantee contact with the trailing edge of the blade at a plurality of points, regardless of any defects in the profile of the blade.

Also preferably, the leading edge reinforcement support further includes end-of-stroke abutments for the wedges. The presence of such end-of-stroke abutments enables the stroke of the wedges of the leading edge reinforcement support to be limited, in particular while applying pressure against the flanges of the metal reinforcement. It is thus possible to guarantee the shape of the metal reinforcement and to limit the flattening of the adhesive film (thus making it possible to guarantee compliance with the minimum required thickness for the adhesive). Furthermore, it is possible to ensure aerodynamic continuity between the metal reinforcement and the blade in the event of the blade being a little too thick.

The leading edge reinforcement support may include means for moving the wedges towards each other or apart from each other.

Likewise, the heater elements of the leading edge reinforcement support may include a circuit for circulating a heat-transfer fluid.

The invention also provides a method of fastening metal reinforcement on the leading edge of a turbine engine blade by using tooling as defined above, the method comprising a step of positioning and clamping the blade in the blade support of the tooling while leaving the surfaces of the leading edge of the blade disengaged, a step of applying adhesive to the disengaged surfaces of the leading edge of the blade, a step of positioning and gripping the metal reinforcement in the leading edge reinforcement support of the tooling, a step of positioning the metal reinforcement on the leading edge of the blade by mounting the blade support on the leading edge reinforcement support, a step of applying pressure against the flanges of the metal reinforcement, and a step of polymerizing the adhesive applied to the disengaged surfaces of the leading edge of the blade by means of the heater elements of the leading edge reinforcement support of the tooling.

Such a method presents the advantage of being capable of being automated without requiring an operator to perform complex interventions. Furthermore, it makes it possible to ensure that the positioning of the metal reinforcement on the leading edge of the blade is fully under control and reproducible.

Preferably, the step of positioning and clamping the blade in the blade support further comprises clamping a trailing edge of the blade.

The step of positioning and gripping the metal reinforcement in the leading edge reinforcement support may comprise successively placing the lateral wedges of the leading edge reinforcement support apart from each other, positioning the metal reinforcement between the wedges of the leading edge reinforcement support, clamping a leading edge of the metal reinforcement between the wedges, and applying suction to the flanges of the metal reinforcement in order to grip them.

After the step of positioning and gripping the metal reinforcement in the leading edge reinforcement support and prior to the step of positioning the metal reinforcement on the leading edge of the blade, the method may further comprise a step of spacing the lateral wedges of the leading edge reinforcement support apart from each other in order to open the flanges of the metal reinforcement.

Prior to the step of moving the lateral wedges of the leading edge reinforcement support apart from each other, additional wedges may be assembled on the leading edge reinforcement support in order to limit the spacing apart of said lateral wedges.

The blade may be made of carbon fiber composite material and the metal reinforcement may be based on titanium.

The invention also provides the application of the method as defined above to fastening metal reinforcement on the leading edge of a turbojet fan blade.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
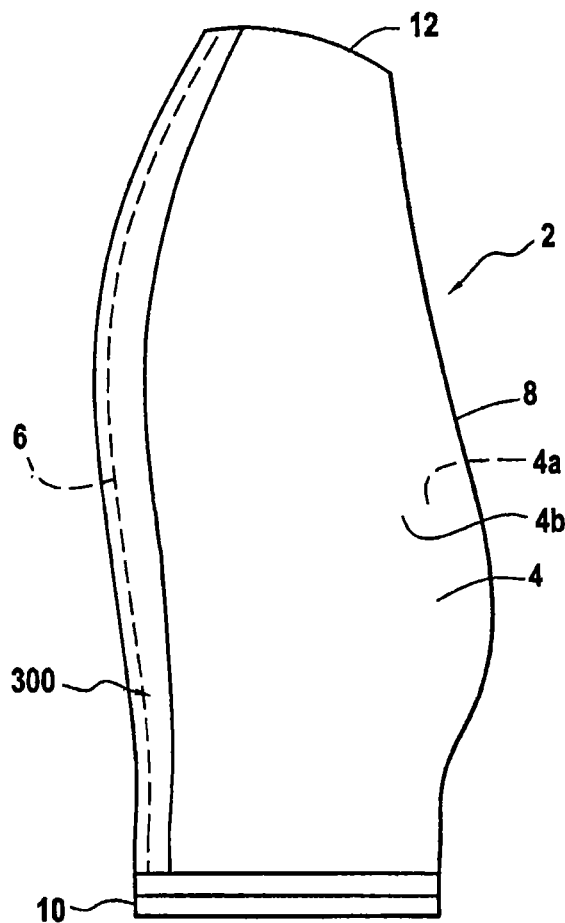
FIG. 1 is a diagrammatic view of a turbojet fan blade provided with metal reinforcement on its leading edge.

The invention applies to fastening metal reinforcement on the leading edge of any turbine engine blade. A preferred application of the invention lies in fastening reinforcement made of titanium on the leading edge of a turbojet fan blade made of carbon fiber composite material, such as that shown in FIG. 1.

In known manner, a turbojet fan blade 2 made of composite material comprises an airfoil 4 having a suction side surface 4a and a pressure side surface 4b. The pressure- and suction-side surfaces extend between a leading edge 6 and a trailing edge 8. The blade also has a root 10 for mounting on a rotor disk.

The composite material blade 2 is obtained by draping or weaving a composite material. By way of example, the composite material may be an assembly of carbon fibers that are woven and molded by an injection method known as resin transfer molding (RTM).

The blade 2 also has metal structural reinforcement 300 that is adhesively bonded on the leading edge 6, extending between the root 10 and the tip 12 of the blade.

In order to fasten the metal reinforcement on the leading edge 6 of such a blade, the invention makes provision for having recourse to special tooling. This tooling is made up of two independent main elements, namely a blade support 100 and a leading edge reinforcement support 200.

Figure 2:
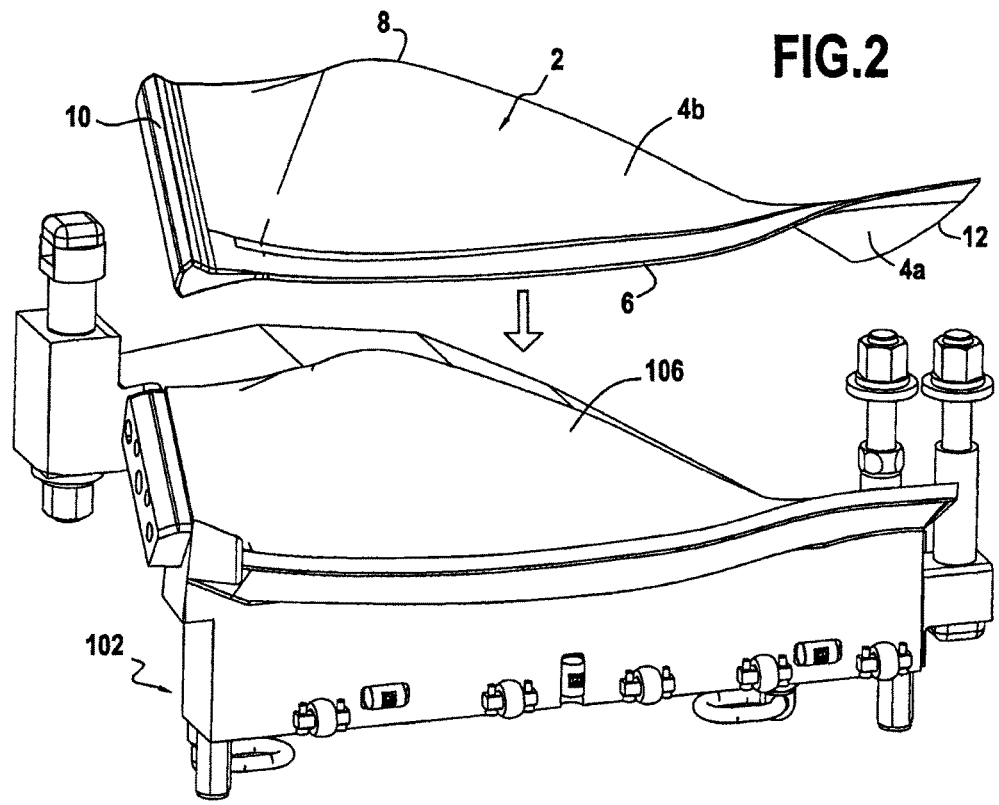
FIGS. 2 to 15 show different steps in the method of fastening metal reinforcement on the leading edge of a blade by means of tooling of the invention.

As shown in FIG. 2, the blade support 100 comprises a suction side half-shell 102 (FIGS. 2 and 3) and a pressure side half-shell 104 (visible in FIGS. 4 and 5, in particular), which half-shells comprise two independent elements that are fastened together.

The suction side half-shell 102 presents a recess 106 of shape complementary to the shape of the suction side surface 4a of the blade. Likewise, the pressure side half-shell 104 also has a recess (not shown in the figures) of shape that is compensatory to the shape of the pressure side surface of the blade.

Figure 4:
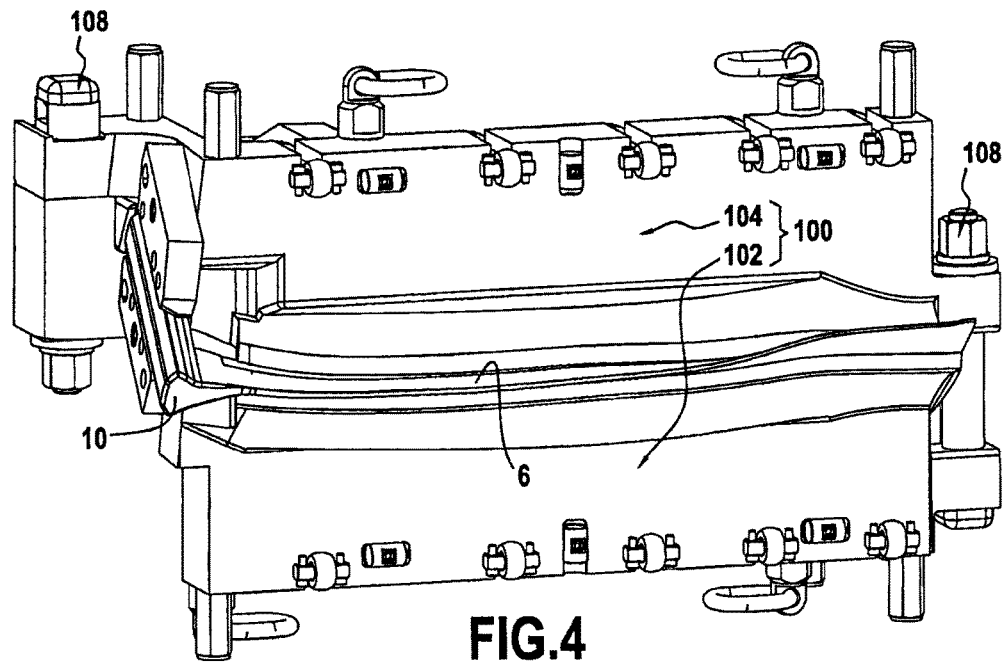
Figure 5:
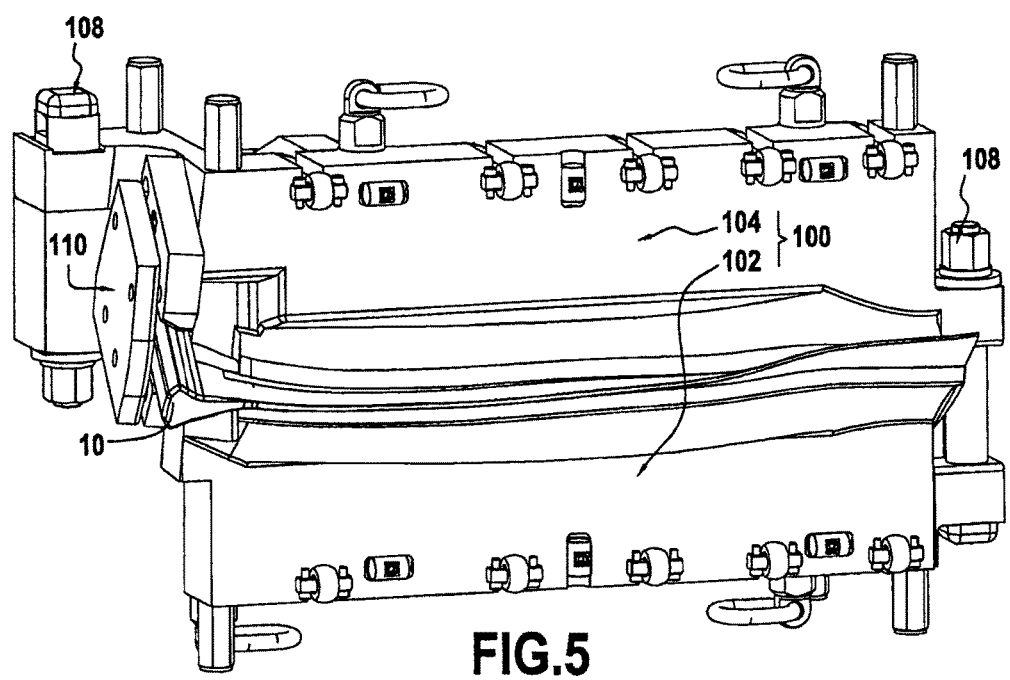

The half-shells 102 and 104 of the blade support 100 are configured in such a manner that, when the blade 2 is positioned between them as shown in FIGS. 4 and 5, only the pressure- and suction-side surfaces of the leading edge 6 of the blade remain completely disengaged. The extent of these surfaces corresponds to the zone on which the metal reinforcement is to be fastened.

The two half-shells 102 and 104 of the blade support 100 may be assembled together, e.g. by means of nut-and-bolt type systems 108, that, on being tightened, serve to clamp the blade 2 positioned between the half-shells.

As shown in FIGS. 9 to 14, the leading edge reinforcement support 200 of the tooling compress a base 202 forming a bottom, two side walls 204 fastened to the bottom 202, e.g. by means of bolts 206, and two lateral wedges 208 that are positioned inside the space defined by the bottom 202 and the side walls 204.

More precisely, the two lateral wedges 208 are spaced apart laterally from each other by a space 210 of general shape that corresponds substantially to the profile of the metal reinforcement that is to be used for the leading edge of the blade.

Furthermore, the two lateral wedges 208 are suitable for being moved laterally towards each other and apart from each other. In the example shown in FIG. 9, the wedges 208 are moved laterally by means of springs 212 exerting thrust on each lateral wedge in order to move it towards the other lateral wedge, these springs being held in their retracted positions by holder screws 214 throughout all stages of use other than the stage of applying pressure. These springs 212 are rated and positioned as a function of the level selected for the pressure to be applied on the metal reinforcement positioned between the wedges.

Naturally, other means for enabling the lateral wedges to move towards each other and apart from each other could be envisaged. For example, it would be possible to use inflatable bladders or hydraulic actuators exerting lateral pressure on the wedges in order to move them.

Each of the lateral wedges 208 is also provided with a suction grid (or grating) 216 that is positioned in its lateral face defining the space 210 for receiving the metal reinforcement. Each of these suction grids 216 is connected to a suction circuit (not shown) leading to outside the tooling.

Figure 16:
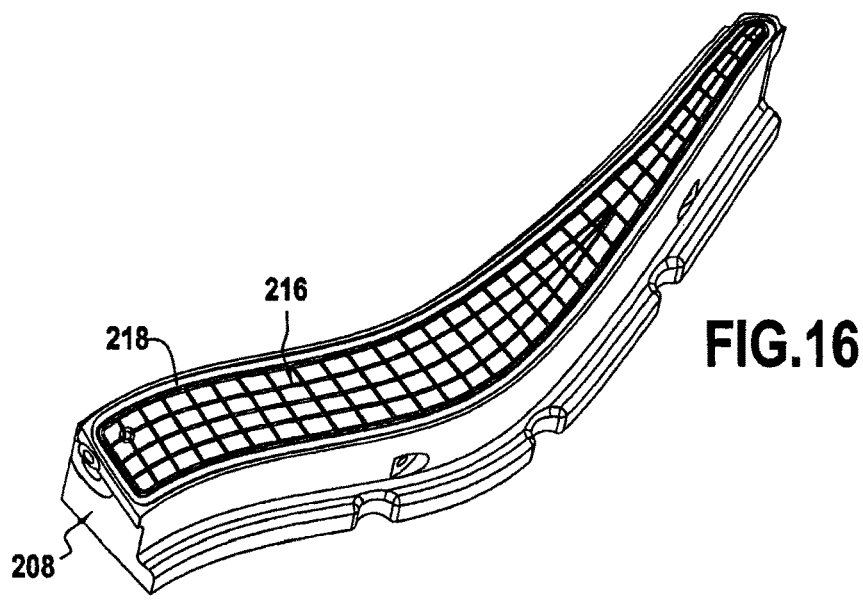
FIG. 16 is a side view of a lateral wedge for supporting the leading edge reinforcement in the tooling of the invention, showing its suction grid.

As shown in FIG. 16, which shows a lateral wedge 208 in side view, a peripheral gasket 218 may be positioned around the suction grid 216.

Furthermore, the leading edge reinforcement support 200 also includes heater elements 220 for polymerizing a film of adhesive applied to the leading edge of the blade when it is positioned in the metal reinforcement.

Figure 17:
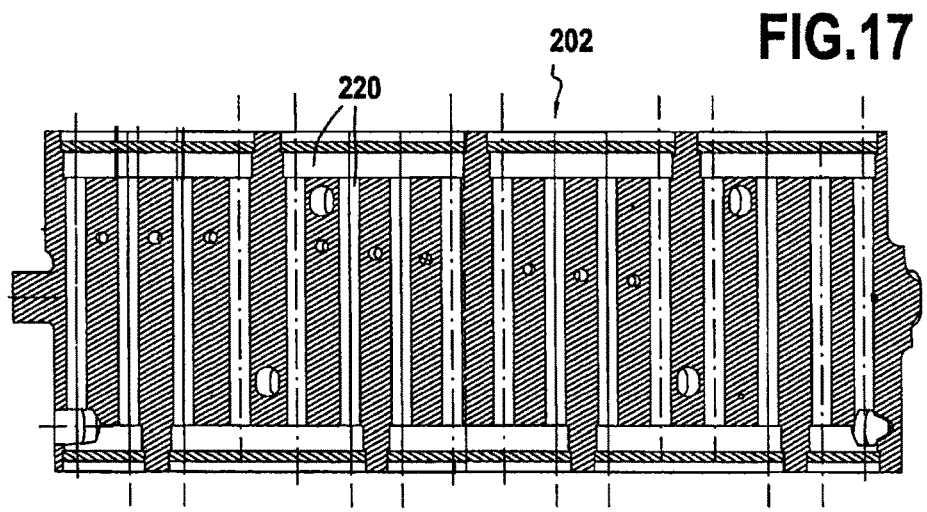
FIG. 17 is a section view of the bottom of the leading edge reinforcement support of the tooling of the invention, showing its heater elements.
Figure 18:
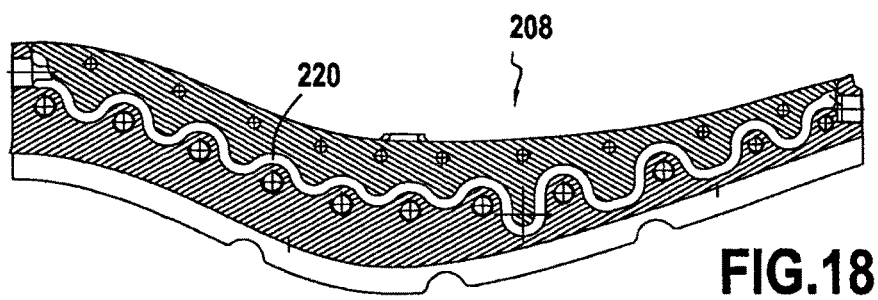
FIG. 18 is a longitudinal section view of a lateral wedge for supporting the leading edge reinforcement in the tooling of the invention, showing its heater elements.

More precisely, and as shown in FIGS. 17 and 18, the heater elements 220 are arranged inside the bottom 202 of the support for the leading edge reinforcement (FIG. 17 shows the bottom in section view) and within each lateral wedge 208 (FIG. 18 is a longitudinal section view of a lateral wedge). In the example shown in the figures, these heater elements are in the form of a circuit for circulating a heat transfer fluid 220. Naturally, it is possible to envisage other types of heater element, for example a resistive electrical circuit or an induction heater circuit.

The leading edge reinforcement support 200 also includes a clamp 222 for engaging the leading edge of the metal reinforcement, which clamp is interposed between the bottom 202 and one of the lateral wedges 208. This clamp 222 serves to clamp the leading edge of the metal reinforcement in its reference position when it is in position in the leading edge reinforcement support.

The method of fastening metal reinforcement on the leading edge of a blade by means of the above-described tooling stems from the above description.

Figure 3:
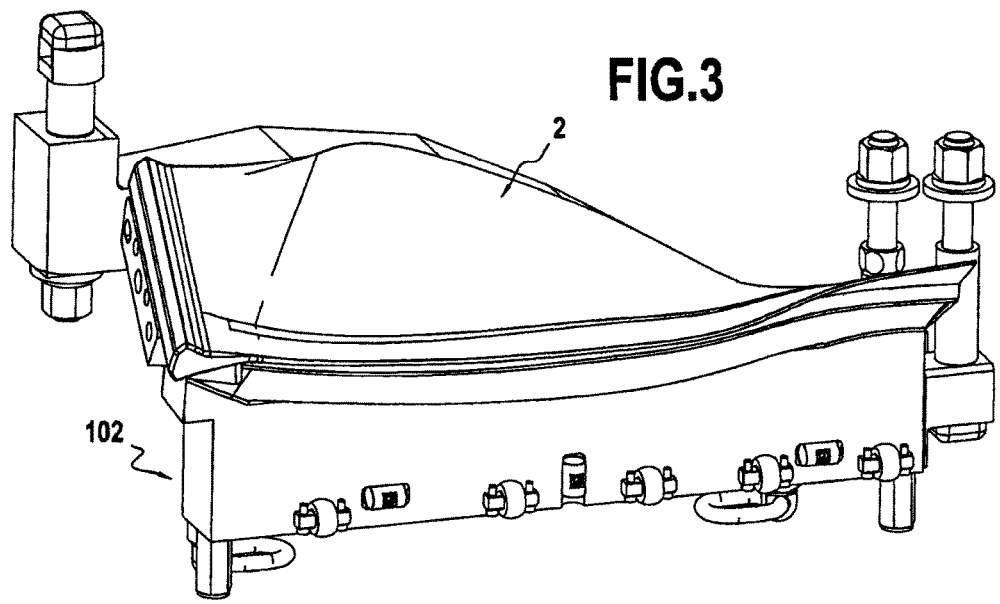

During a first step of the fastening method, the blade 2 is positioned on the suction side half-shell 102 of the blade support 100 by placing its suction side face 4a on the recess 106 in the suction side half-shell (FIGS. 2 and 3).

The following step consists in mounting the pressure side half-shell 104 on the blade by positioning the recess of this half-shell on the pressure side surface 4b of the blade (FIG. 4).

A wedge 110 for tightening the root of the blade is then put into place against the root 10 of the blade (FIG. 5) and the blade is clamped in the blade support 100 by tightening the nut-and-bolt type systems 108. This tightening force is controlled by using a torque wrench.

Figure 6:
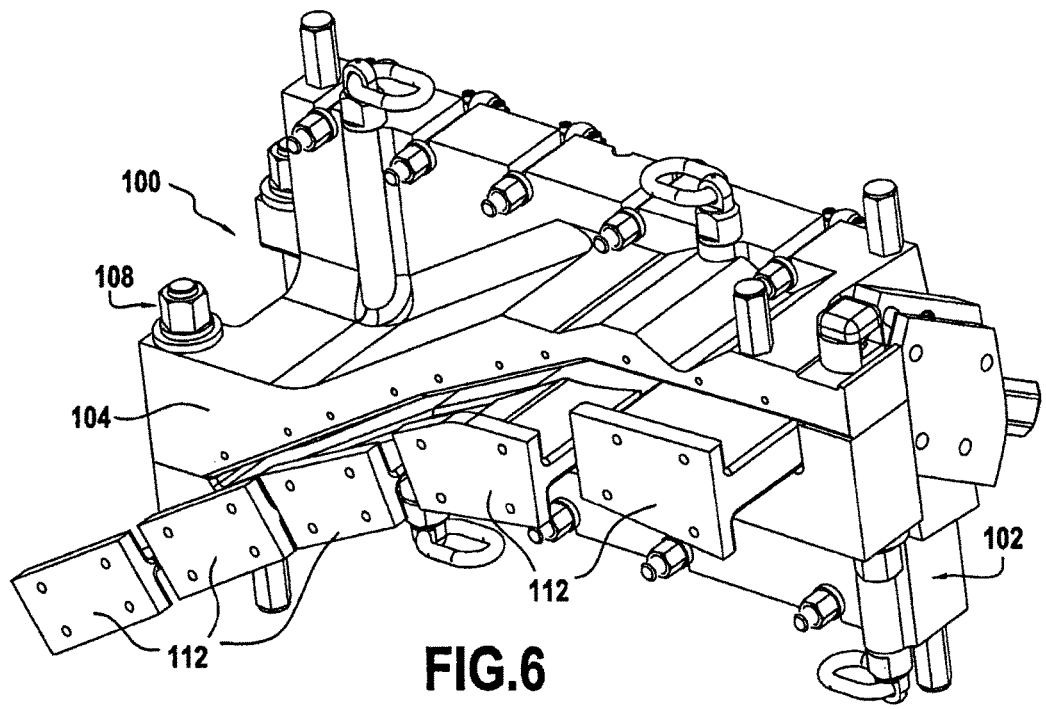
Figure 7:
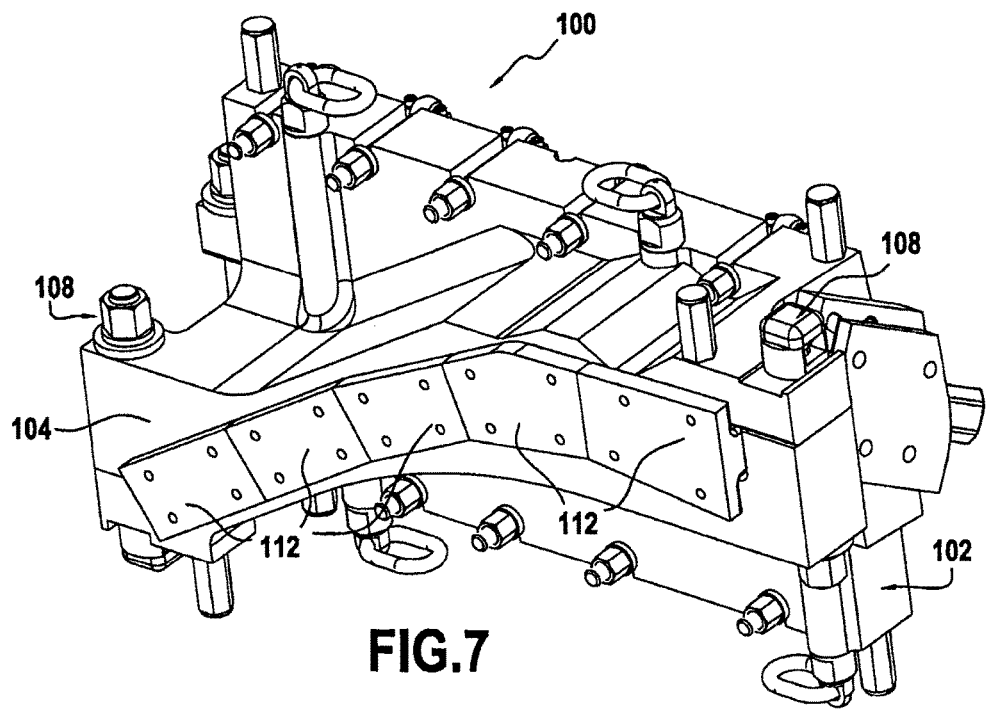

The following step of the method consists in clamping the trailing edge 8 of the blade. For this purpose, the blade support 100 has a plurality of trailing edge wedges 112 that are inserted between the trailing edge of the blade and the pressure side half-shell 104 (FIGS. 6 and 7).

Clamping the trailing edge of the blade guarantees that the blade is held in place in the blade support in the event of the blade being too thin. Furthermore, using a plurality of trailing edge clamping wedges 112 serves to guarantee contact with the blade trailing edge at a plurality of points in spite of any potential defects in its profile.

Thus, the blade 2 is positioned and properly clamped in the blade support 100 of the tooling, while leaving the surfaces of the leading edge of the blade completely disengaged.

During the following step, the metal reinforcement 300 that is to be fastened on the leading edge 6 of the blade is positioned in the leading edge reinforcement support 200 of the tooling.

Figure 10:
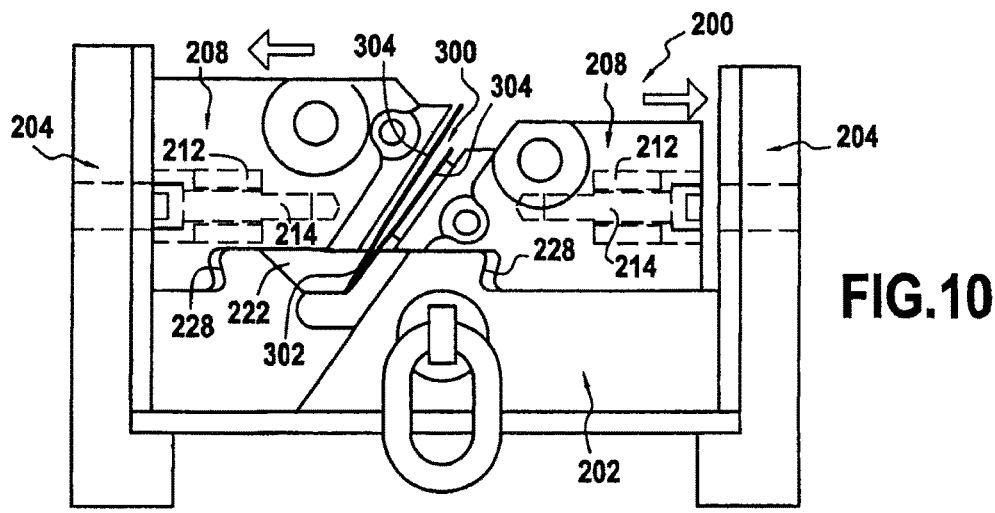

For this purpose, and as shown in FIG. 10, the lateral wedges 208 of the leading edge reinforcement support are spaced apart from each other (manually in this example) so as to enable the metal reinforcement 300 to be positioned between them in the space 210. The clamp 222 for the metal reinforcement leading edge serves at this stage to ensure that a leading edge 302 of the metal reinforcement 300 is clamped in its reference position between the wedges.

Figure 11:
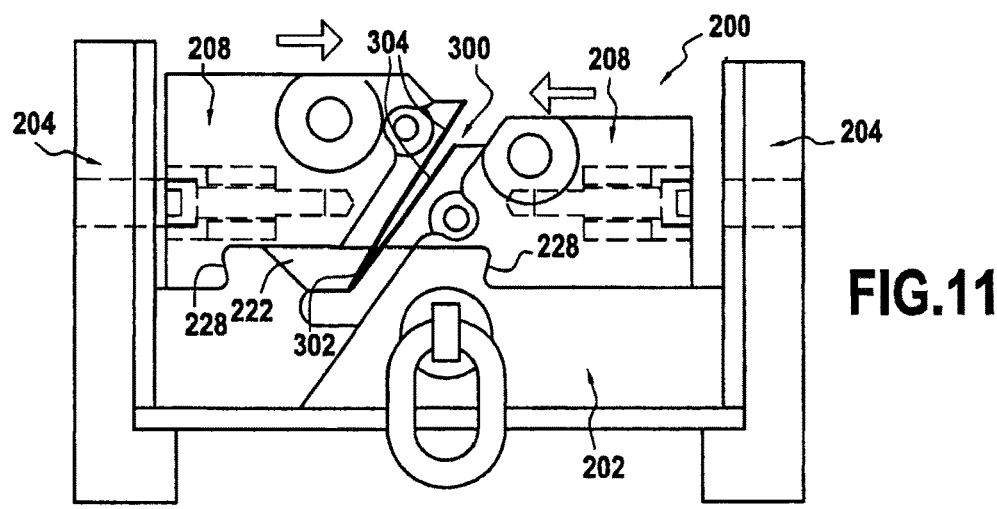

Once the metal reinforcement is in position on the leading edge reinforcement support, the wedges 208 are moved manually towards each other so that their respective side faces come into contact with the flanges 304 (or side faces) of the metal reinforcement, and the suction grids of the wedges are put into operation in order to ensure that the flanges 304 of the metal support are gripped by suction (FIG. 11).

Figure 12:
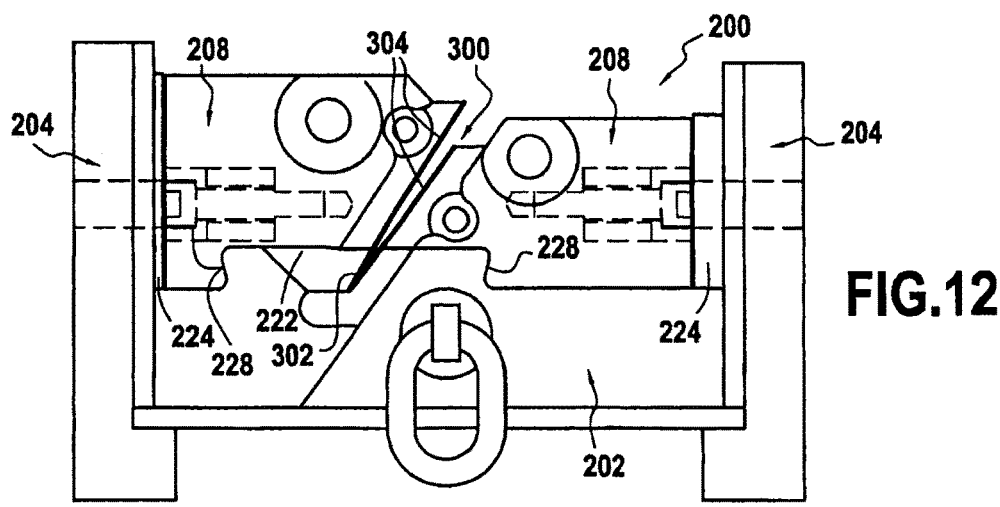

Additional wedges 224 are then placed on the leading edge reinforcement support between the side walls 204 and the wedges 208 (FIG. 12). These additional wedges serve during the following step of opening to limit the extent said wedges 208 of the leading edge reinforcement support are spaced from the flanges of the metal reinforcement and to control the stroke of the springs 212 for applying pressure, and thus to control the force that they generate.

Figure 13:
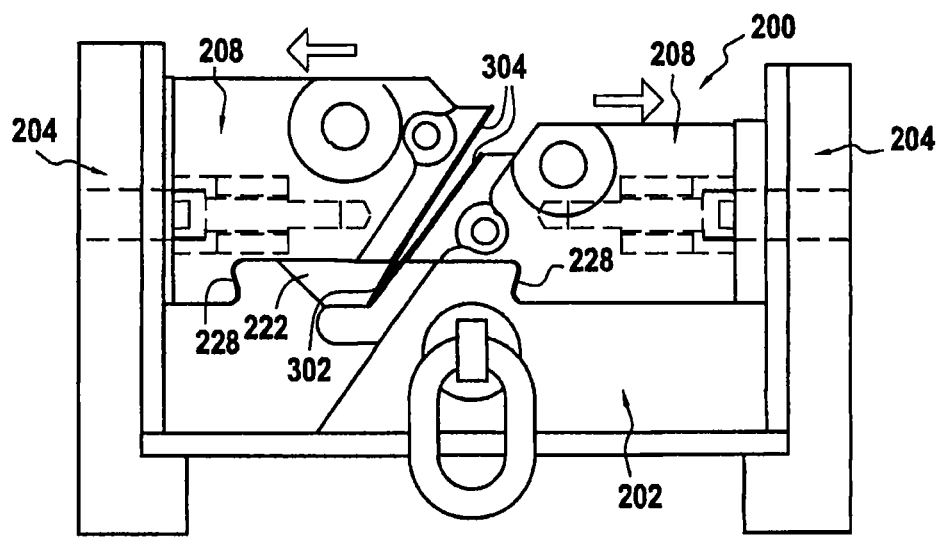
Figure 14:
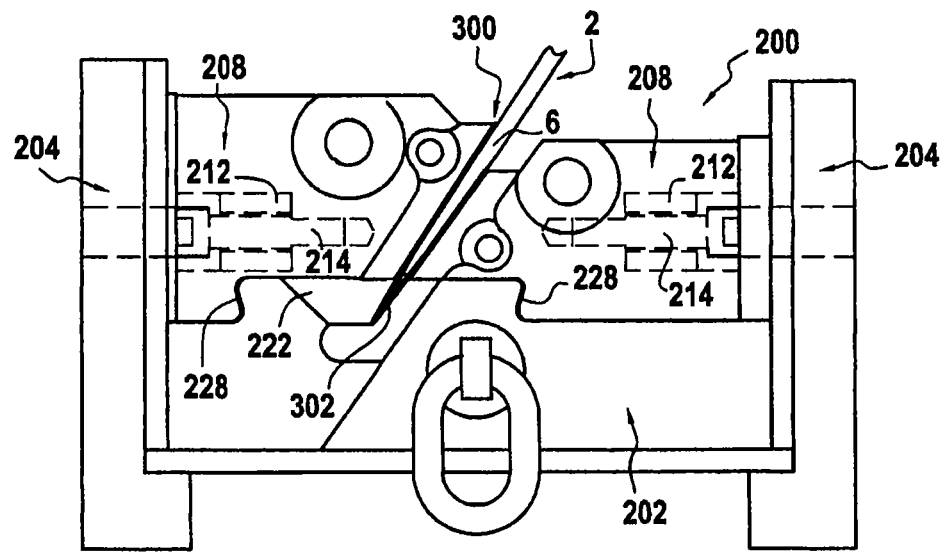

With the flanges 304 of the metal reinforcement 300 held in contact with the side faces of the wedges 208 by suction, the spacing apart of the wedges 208 during the following step leads to said flanges 304 of the metal reinforcement being splayed open so as to enable the leading edge of the blade to be inserted (FIGS. 13 and 14). In order to overcome the resistance of the flanges of the metal reinforcement, this spacing is performed by means of wedge opening screws (not shown in the figures) that are accessible from the side walls 204 of the leading edge reinforcement support.

Figure 8:
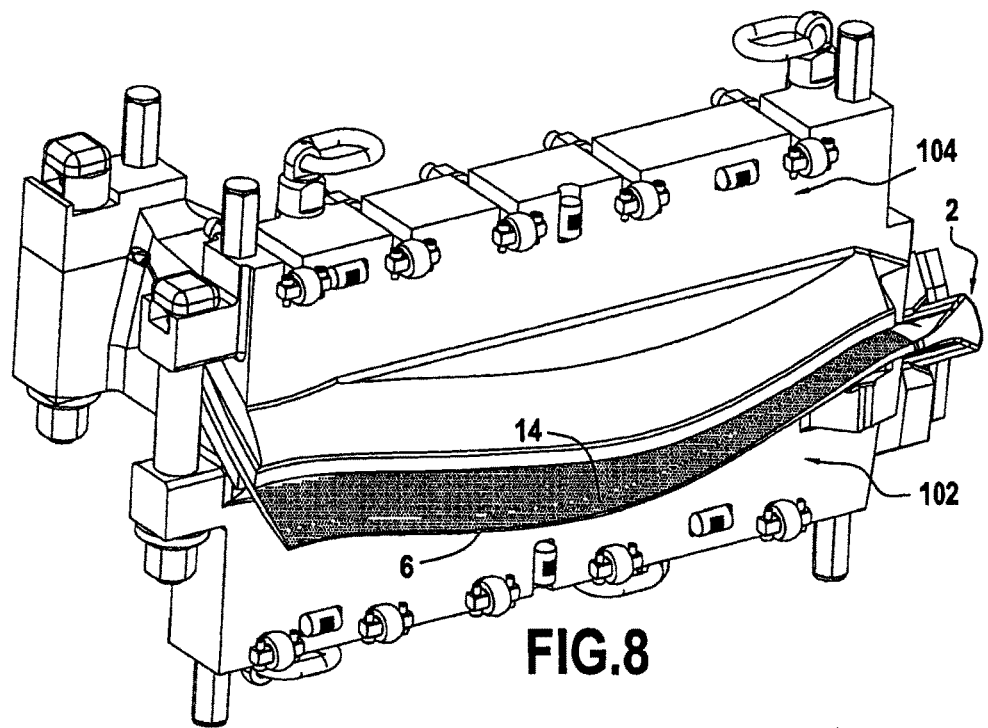
Figure 9:
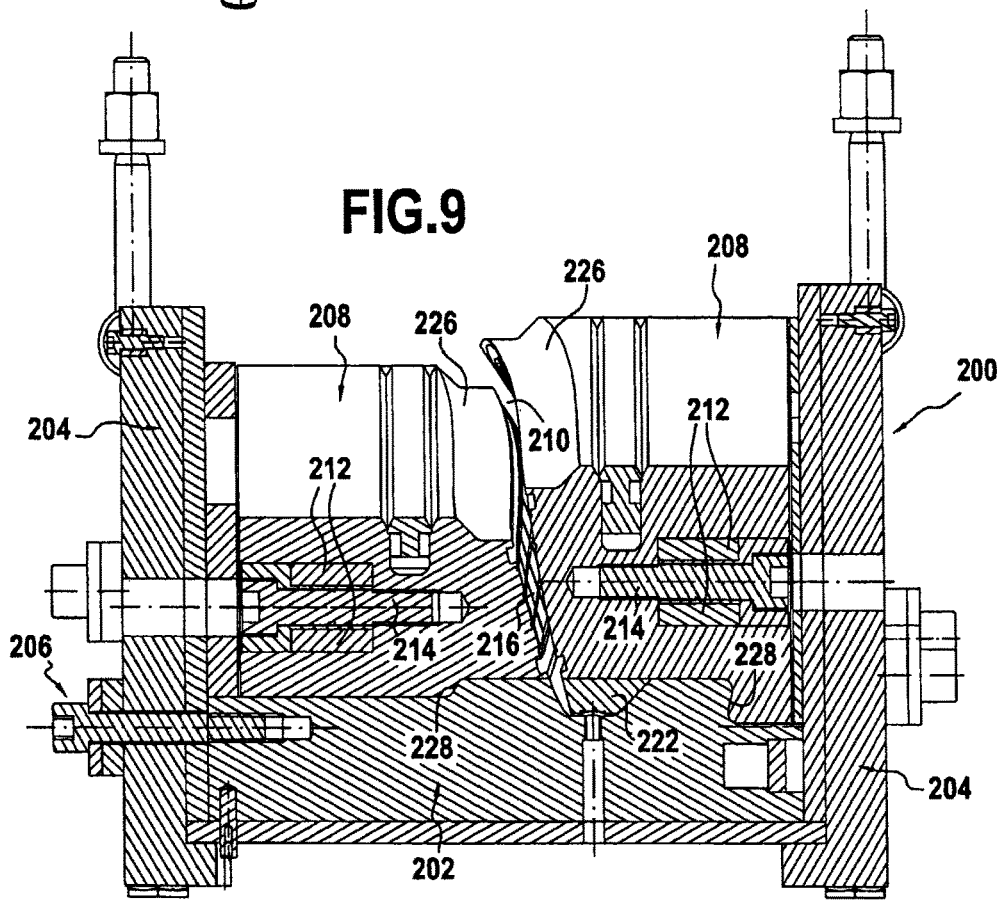

Prior to positioning the leading edge 6 of the blade 2 between the flanges 304 of the metal reinforcement 300, it is necessary to apply adhesive 14 on the surfaces of the leading edge of the blade that are not in engagement with the blade support (see FIG. 8). For this purpose, a film of adhesive may be applied on the leading edge of the blade. Alternatively, adhesive in the form of paste may be applied to the bottom of the cavity in the metal reinforcement, with the movement of the tooling during assembly serving to spread the adhesive over the entire surfaces of the leading edge that are to receive adhesive. Also alternatively, a liquid adhesive could be injected once the metal reinforcement has been put into place against the leading edge of the blade.

Figure 15:
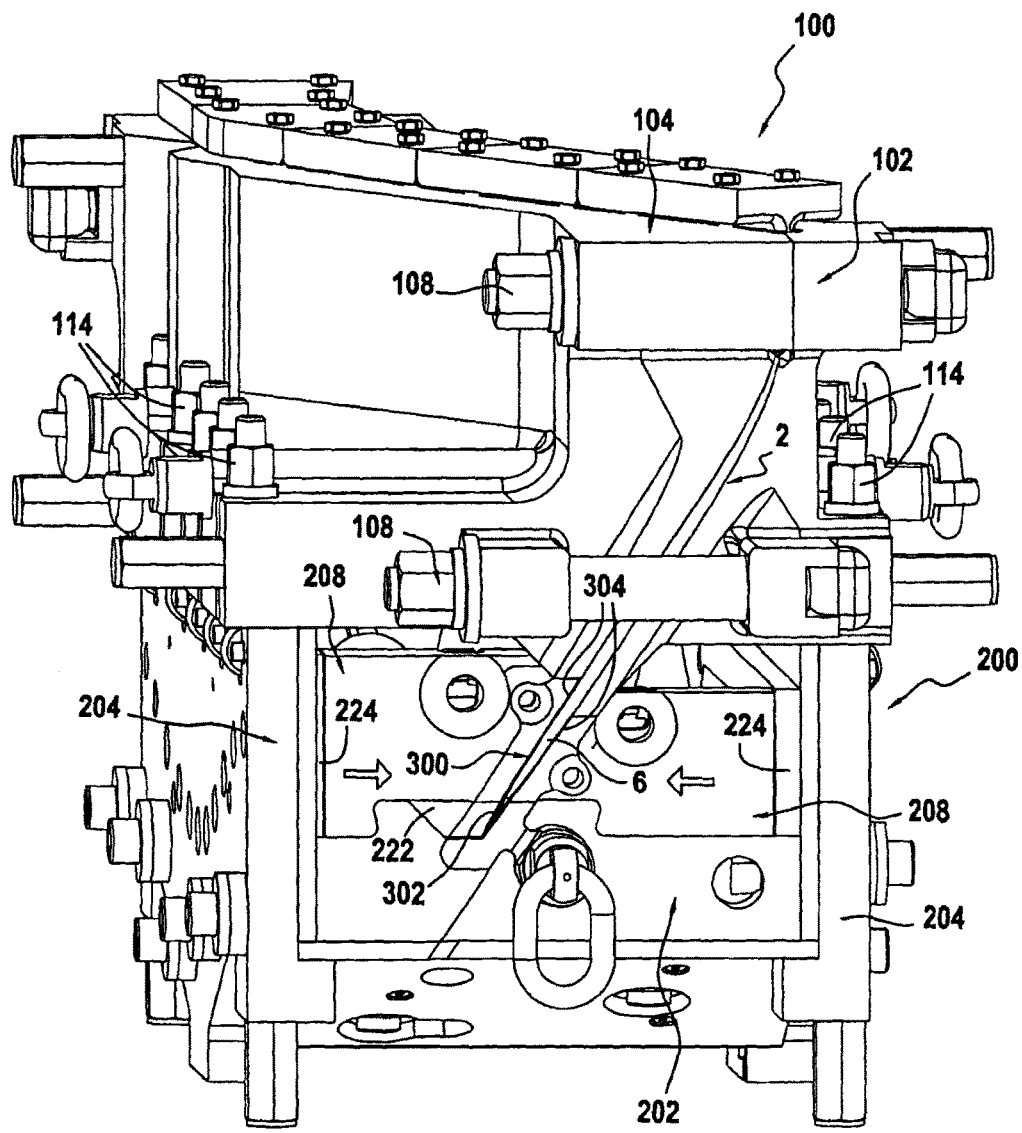

Thereafter, the leading edge 6 of the blade 2 is positioned between the flanges 304 of the metal reinforcement 300 by mounting the blade support 100 on the leading edge reinforcement support 200 (FIG. 15). Given the twisted shape of the leading edge of the blade, such assembly requires combined movements both in translation and in rotation.

Tightening screws 114 then serve to provide clamping between the blade support 100 and the leading edge reinforcement support 200, and also to apply pressure under the leading edge 302 of the metal reinforcement 300. As a result, the film of adhesive is compacted at the tip of the metal reinforcement to its final dimensions.

Thereafter, the following step consists in moving the wedges 208 of the leading edge reinforcement support towards each other once more (by loosening the opening screws of the wedges and then loosening the screws 214 that hold the springs 212) so as to apply pressure on the flanges 304 of the metal reinforcement. The pressure that is applied in this way can be adjusted as a function of requirements by adjusting the number of springs 212, by adjusting their stiffness, and by the level of compression that is selected.

Furthermore, the presence of end-of-stroke abutments on the leading edge reinforcement support for stopping the stroke of its lateral wedges enables a thickness to be guaranteed for the adhesive film. More precisely, and as shown in particular in FIG. 9, each wedge 208 has a shoulder 226 forming an end-of-stroke abutment that comes to bear against the blade or the blade support as the wedges 208 move towards each other. Furthermore, the bottom 202 of the leading edge reinforcement support also includes two shoulders 228 forming end-of-stroke abutments, against which the wedges 208 come to bear as they move towards each other.

During this step of applying pressure on the flanges of the metal reinforcement, the flanges continue to be gripped by suction in order to guarantee the positioning of the metal reinforcement in the event of a failure in the closure of its flanges.

The heater elements 220 of the leading edge reinforcement support 200 are put into operation (before or after the step of applying pressure on the flanges of the metal reinforcement) in order to start a cycle of polymerizing the adhesive film (causing temperature to rise, dwell, and then drop).

Once the adhesive has polymerized and the assembly has cooled down, the blade with its leading edge covered in the metal reinforcement can be released from the tooling. For this purpose, the wedges of the leading edge reinforcement support are once more spaced apart from each other, the leading edge clamp is released, and the blade support is separated from the leading edge reinforcement support. Finally, the blade is released from the blade support by disassembling its two half-shells.

The invention claimed is:

1. A tooling for fastening a metal reinforcement on a leading edge of a turbine engine blade, the tooling comprising:
    a blade support for receiving the turbine engine blade while leaving surfaces of the leading edge of the blade disengaged; and
    a leading edge reinforcement support on which the blade support is designed to be mounted, and comprising two lateral wedges between which the metal reinforcement for the leading edge of the blade is to be positioned, the wedges being capable of moving towards each other and apart from each other and each of the wedges being provided with a suction grid for gripping the metal reinforcement, the leading edge reinforcement support further including heater elements for polymerizing an adhesive film applied on the leading edge surfaces of the blade when the blade is in position against the metal reinforcement,
    wherein the leading edge reinforcement support further comprises shoulders forming end-of-stroke abutments shaped for coming to bear against one of the blade, the blade support and the wedges, as the wedges move toward one another.

2. The tooling according to claim 1, wherein the blade support comprises a suction side half-shell having a recess of shape complementary to a shape of a suction side surface of the blade, a pressure side half-shell having a recess of shape complementary to a shape of a pressure side surface of the blade, and means for applying a tightening force between the pressure side half-shell and the suction side half-shell.

3. The tooling, according to claim 1 or claim 2, wherein the blade support further includes wedges for clamping a leading edge of the blade.

4. The tooling according to claim 1, wherein the leading edge reinforcement support includes means for moving the wedges towards each other or apart from each other.

5. The tooling according to claim 1, wherein the heater elements of the leading edge reinforcement support include a circuit for circulating a heat transfer fluid.

6. A method of fastening a metal reinforcement on a leading edge of a turbine engine blade by using a tooling according to claim 1, the method comprising:
    a step of positioning and clamping the blade in the blade support of the tooling while leaving the surfaces of the leading edge of the blade disengaged;
    a step of applying adhesive to the disengaged surfaces of the leading edge of the blade;
    a step of positioning and gripping the metal reinforcement in the leading edge reinforcement support of the tooling;
    a step of positioning the metal reinforcement on the leading edge of the blade by mounting the blade support on the leading edge reinforcement support;
    a step of applying pressure against flanges of the metal reinforcement; and
    a step of polymerizing the adhesive applied to the disengaged surfaces of the leading edge of the blade by means of the heater elements of the leading edge reinforcement support of the tooling.

7. A method according to claim 6, wherein the step of positioning and clamping the blade in the blade support further comprises clamping a trailing edge of the blade.

8. A method according to claim 6 or claim 7, wherein the step of positioning and gripping the metal reinforcement in the leading edge reinforcement support comprises successively placing the lateral wedges of the leading edge reinforcement support apart from each other, positioning the metal reinforcement between the wedges of the leading edge reinforcement support, clamping a leading edge of the metal reinforcement between the wedges, and applying suction to the flanges of the metal reinforcement in order to grip the flanges.

9. A method according to claim 6, further including, after the step of positioning and gripping the metal reinforcement in the leading edge reinforcement support and prior to the step of positioning the metal reinforcement on the leading edge of the blade, a step of spacing the lateral wedges of the leading edge reinforcement support apart from each other in order to open the flanges of the metal reinforcement.

10. A method according to claim 9, wherein, prior to the step of spacing the lateral wedges of the leading edge reinforcement support apart from each other, additional wedges are assembled on the leading edge reinforcement support in order to limit the spacing apart of said lateral wedges.

11. A method according to claim 6, wherein the blade is made of carbon fiber composite material and the metal reinforcement is based on titanium.

12. A method according to claim 6, wherein the blade is a turbojet fan blade.

* * * * *